US010486108B2

(12) United States Patent
Orazem et al.

(10) Patent No.: US 10,486,108 B2
(45) Date of Patent: Nov. 26, 2019

(54) ELECTROKINETIC DEWATERING OF PHOSPHATIC CLAY SUSPENSIONS

(71) Applicant: University of Florida Research Foundation, Inc., Gainesville, FL (US)

(72) Inventors: Mark E. Orazem, Gainesville, FL (US); Rui Kong, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 337 days.

(21) Appl. No.: 14/433,163

(22) PCT Filed: Oct. 3, 2013

(86) PCT No.: PCT/US2013/063192
§ 371 (c)(1),
(2) Date: Apr. 2, 2015

(87) PCT Pub. No.: WO2014/055723
PCT Pub. Date: Apr. 10, 2014

(65) Prior Publication Data
US 2015/0273398 A1 Oct. 1, 2015

Related U.S. Application Data

(60) Provisional application No. 61/709,402, filed on Oct. 4, 2012.

(51) Int. Cl.
*B01D 61/56* (2006.01)
*B09B 3/00* (2006.01)
(Continued)

(52) U.S. Cl.
CPC ......... *B01D 61/56* (2013.01); *B01D 21/0009* (2013.01); *B09B 3/00* (2013.01);
(Continued)

(58) Field of Classification Search
CPC ... B01D 21/0009; B01D 61/56; C02F 11/006; C02F 11/12; C02F 11/4698
See application file for complete search history.

(56) References Cited

U.S. PATENT DOCUMENTS 2,370,120 A * 2/1945 Bousman ............... B01D 21/06
210/531
3,271,081 A * 9/1966 Huddleston .......... B01D 9/0013
418/181

(Continued)

FOREIGN PATENT DOCUMENTS

CA         840993 A     5/1970
CN     101311133 A    11/2008
(Continued)

OTHER PUBLICATIONS

Guo, Thesis on Electrokinetic Dewatering of Oil Sand Tailings, University of Western Ontario, Canada, 2012 (Year: 2012).*
(Continued)

*Primary Examiner* — Salil Jain
(74) *Attorney, Agent, or Firm* — Thomas Horstemeyer, LLP

(57) ABSTRACT

Various examples are provided for electrokinetic dewatering of e.g., phosphatic clay suspensions. In one example, among others, a system includes a separation chamber including an anode and a cathode extending ends of the separation chamber and a power supply configured to energize the anode and the cathode to establish an electric field. An inlet at one end of the separation chamber can supply a dilute feed suspension and an outlet at another end of the separation chamber can remove supernatant water. The electric field can consolidate solids in the dilute feed suspension. Consolidated solids may be removed by a removal mechanism. In another example, a method includes supplying a dilute
(Continued)

feed suspension including suspended solids, establishing an electric field to consolidate solids, and removing supernatant water.

18 Claims, 12 Drawing Sheets

(51) Int. Cl.
 *C02F 11/15*  (2019.01)
 *C02F 11/00*  (2006.01)
 *C02F 11/12*  (2019.01)
 *B01D 21/00*  (2006.01)
 *C02F 101/10*  (2006.01)

(52) U.S. Cl.
 CPC ............ *C02F 11/006* (2013.01); *C02F 11/12* (2013.01); *C02F 11/15* (2019.01); *C02F 2101/105* (2013.01); *C02F 2209/001* (2013.01); *C02F 2209/003* (2013.01); *C02F 2209/006* (2013.01); *C02F 2209/10* (2013.01); *C02F 2209/11* (2013.01); *C02F 2209/40* (2013.01)

(56) References Cited

U.S. PATENT DOCUMENTS

| | | | | |
|---|---|---|---|---|
| 3,397,143 A | * | 8/1968 | Sontheimer | B01D 21/20 210/208 |
| 3,960,725 A | * | 6/1976 | Bjermo | B01D 35/18 210/770 |
| 3,962,069 A | * | 6/1976 | Inoue | B01D 33/04 204/649 |
| 4,107,026 A | | 8/1978 | Freeman | |
| 4,671,874 A | | 6/1987 | Fremony et al. | |
| 4,755,305 A | | 7/1988 | Fremont et al. | |
| 4,808,304 A | * | 2/1989 | Deal | B01D 21/0009 204/649 |
| 5,378,334 A | * | 1/1995 | Dadoo | G01N 27/44717 204/452 |
| 5,435,893 A | | 7/1995 | Sun et al. | |
| 2008/0271999 A1 | * | 11/2008 | Jones | H01B 1/22 204/450 |
| 2009/0159426 A1 | | 6/2009 | Chen | |

FOREIGN PATENT DOCUMENTS

| | | | | |
|---|---|---|---|---|
| EP | 0582314 A2 | | 2/1994 | |
| FR | 1516158 A | * | 3/1968 | ............... A23L 2/70 |
| GB | 1170413 A | * | 11/1969 | ............ C02F 11/006 |
| WO | 2005/058463 | | 6/2005 | |

OTHER PUBLICATIONS

International Search Report for PCT/US2013/063192 filed on Oct. 3, 2013.

Supplementary European Search Report for EP 13 84 3136 dated Jun. 7, 2016.

\* cited by examiner

ELECTROKINETIC DEWATERING OF PHOSPHATIC CLAY SUSPENSIONS

CROSS-REFERENCE TO RELATED APPLICATION

This application is the 35 U.S.C. § 371 national stage application of PCT Application No. PCT/US2013/063192, filed Oct. 3, 2013, the entirety of which is hereby incorporated by reference and which also claims priority to, and the benefit of, U.S. Provisional Application having Ser. No. 61/709,402, filed Oct. 4, 2012, the entirety of which is hereby incorporated by reference.

BACKGROUND

A dilute suspension of phosphatic clays is a waste product of phosphate ore beneficiation where the mineral is separated from the ore during processing. The waste clay suspensions, which can initially contain 3-5 wt % of solids, are pumped to large impoundment areas termed clay settling areas (CSAs) for consolidation. However, increase in the solids content proceeds very slowly. In some cases, settling and self-consolidation of the clay can take 25 years to reach a solids content of 25-40 wt %. In central Florida, CSAs cover over 150 square miles, which represents 30% of the mined land.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
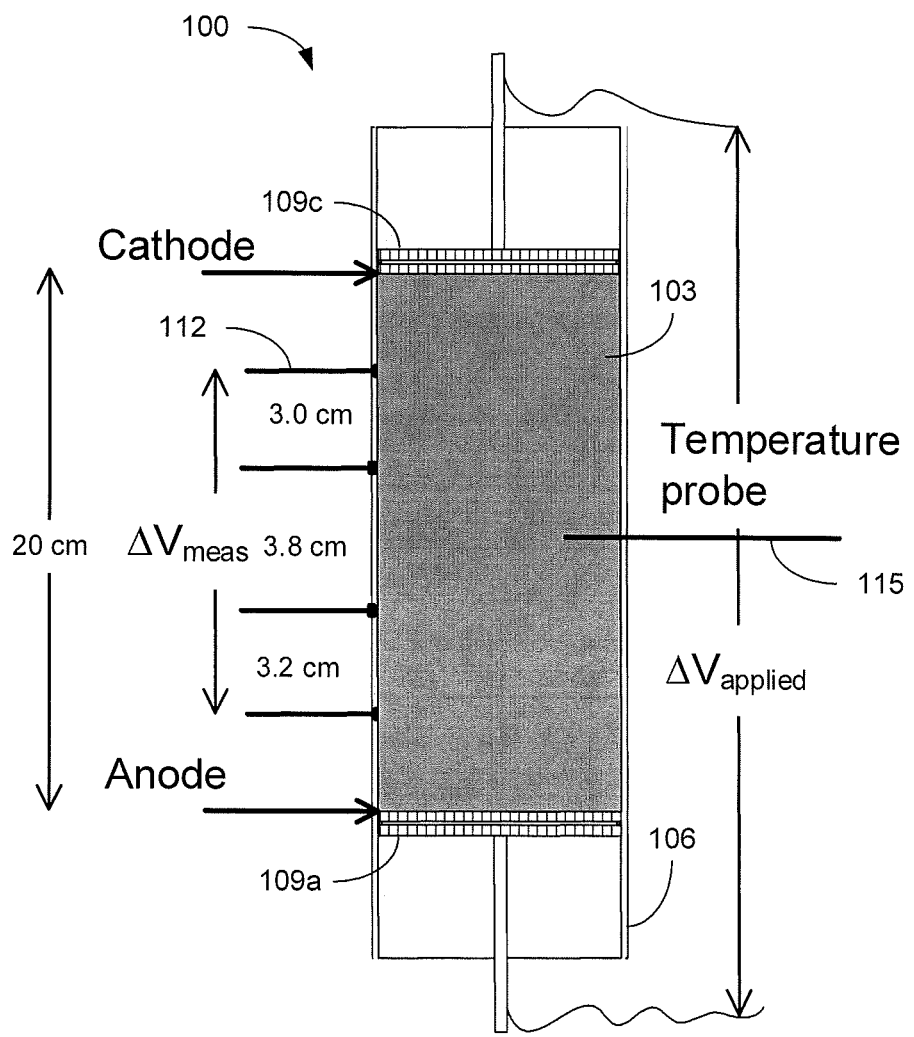
FIG. 1 is a graphical representation of an example of a cell for static consolidation of solids in a phosphatic clay suspension.

Disclosed herein are various embodiments related to electrokinetic dewatering of phosphatic clay suspensions. Reference will now be made in detail to the description of the embodiments as illustrated in the drawings, wherein like reference numbers indicate like parts throughout the several views.

Clay settling areas (CSAs) with an area of about square mile are commonly used to separate water from the solids in the slurry from a beneficiation plant. Initially, the dilute slurry can include 3-5 wt % solids, which are roughly made up of equal parts of clay, silica, and phosphate. The solids are allowed to settle for further consolidation of the solids. The addition of a flocculating agent may yield about 10 wt % of solids, but further separation can take 25 years or more. An applied electric field can greatly enhance removal of water from the phosphatic clay suspensions associated with the phosphate mining operations. Electrokinetic separation takes advantage of the charge in the suspended particles, without the use of additional materials and/or chemicals.

Figure 2A:
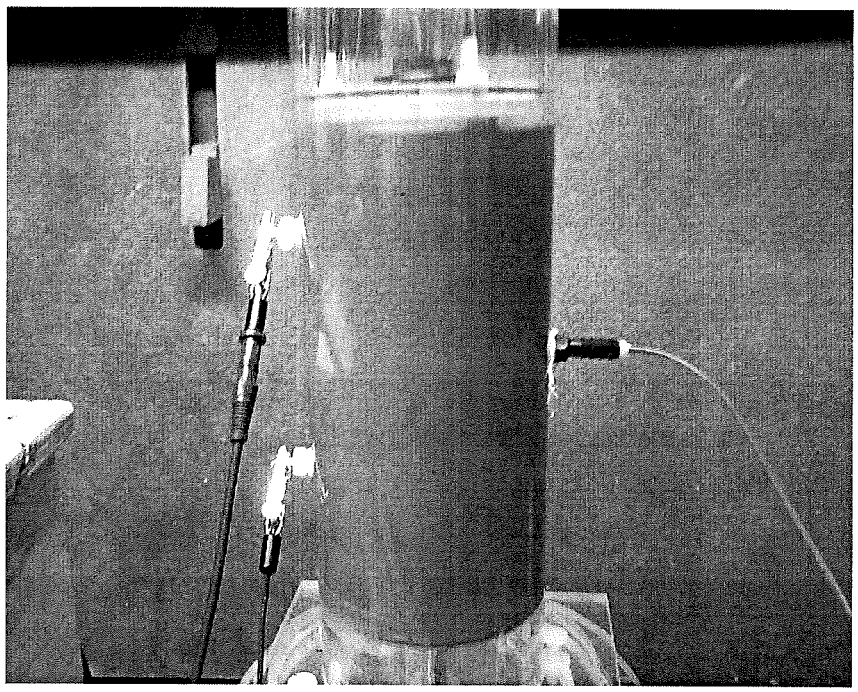
FIGS. 2A and 2B are pictures depicting a cell of FIG. 1 filled with an initial phosphatic clay suspension and a lump of consolidated solids after removal of the supernatant water.
Figure 2B:
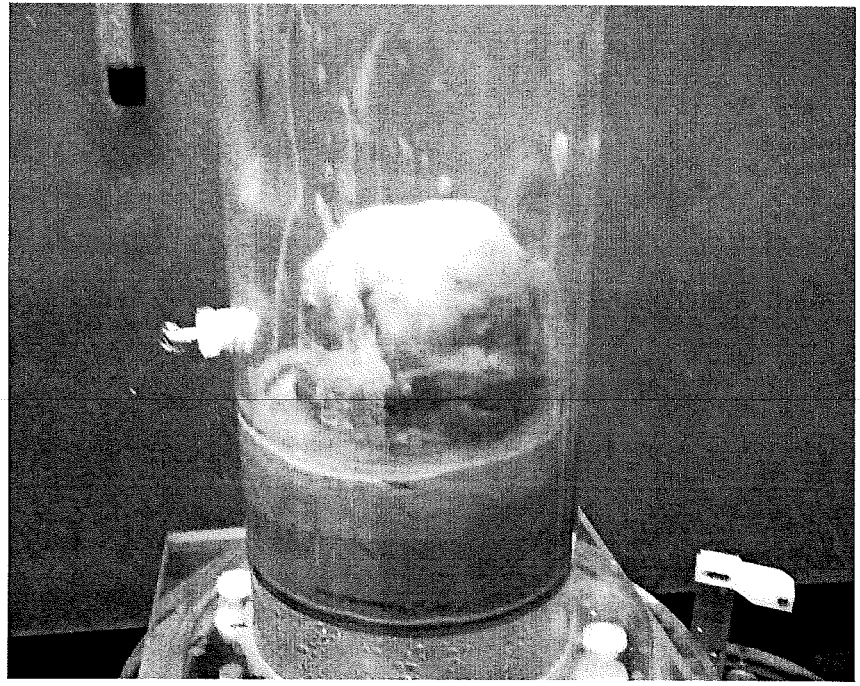

Referring to FIG. 1, shown is a graphical representation of an example of a cell 100 for static consolidation of solids in a phosphatic clay suspension 103. The cell 100 includes a Plexiglas cylinder 106 with electrodes 109 mounted at opposite sides of the suspension 103. The cell 100 is mounted vertically with the cathode 109c placed at the top and the anode 109a placed at the bottom. The electric field produced between the cathode 109c and anode 109a applies a downward force on the negatively charged clay particles towards the positively charged anode 109a. Voltage probes 112 and a temperature probe 115 allowed for monitoring of the phosphatic clay suspension 103 during testing. In a static batch electrokinetic experiment, starting with a suspension of about 10 wt % solids, an electric field of 4 V/cm produced a solids content of about 35 wt % in only 9 hours. FIG. 2A is a picture depicting the cylinder 106 filled with an initial phosphatic clay suspension 103 of about 9.3 wt % and FIG. 2B is a picture illustrating a lump of consolidated solids of about 33.5 wt % after the supernatant water was removed from the cylinder 106.

At short operating times, the increase in solids content was proportional to the product of the electric field and the time over which the field was applied. Maximum solids content was reached with longer operation times and was a strong function of the electric field. The maximum increase in solids content achievable was found to be proportional to the logarithm of the electric field, which can be described by:

$$\Delta w_s = [(0.77\ tE)^{-n} + (7.1\ \log_{10}(E) + 16.5^{-n}]^{-1/n}$$

Where n is a dimensionless parameter that controls the transition from short-time to long-time behavior, E has units of V/cm, and t has units of hours. The change in solids content $\Delta w_s$ is in reference to the initial composition of the suspension 103. Analysis showed that a solids content of about 25 wt % could be achieved in 19 hours with an electric field of 1.2 V/cm at an electrical cost of about $4/1,000 kg of clean water produced. The energy requirement for removal of water ranged from 1.25 to 175 Wh/kg water removed as a function of the electric field.

When this is translated to a one-square-mile CSA, the power requirements for increasing the solids content from about 10 wt % to about 25 wt % are on the order of 40,000 MW. At a cost of $0.10/kW-hr, the energy cost would be approximately $80 million for the water removed. By applying electrokinetic dewatering as part of a continuous or semi-continuous process, the power requirement may be reduced by dewatering over a longer period of time. The gap between the electrodes may also be reduced, allowing operation at a reduced electrode voltage while still obtaining the desired electric field.

Figure 3:
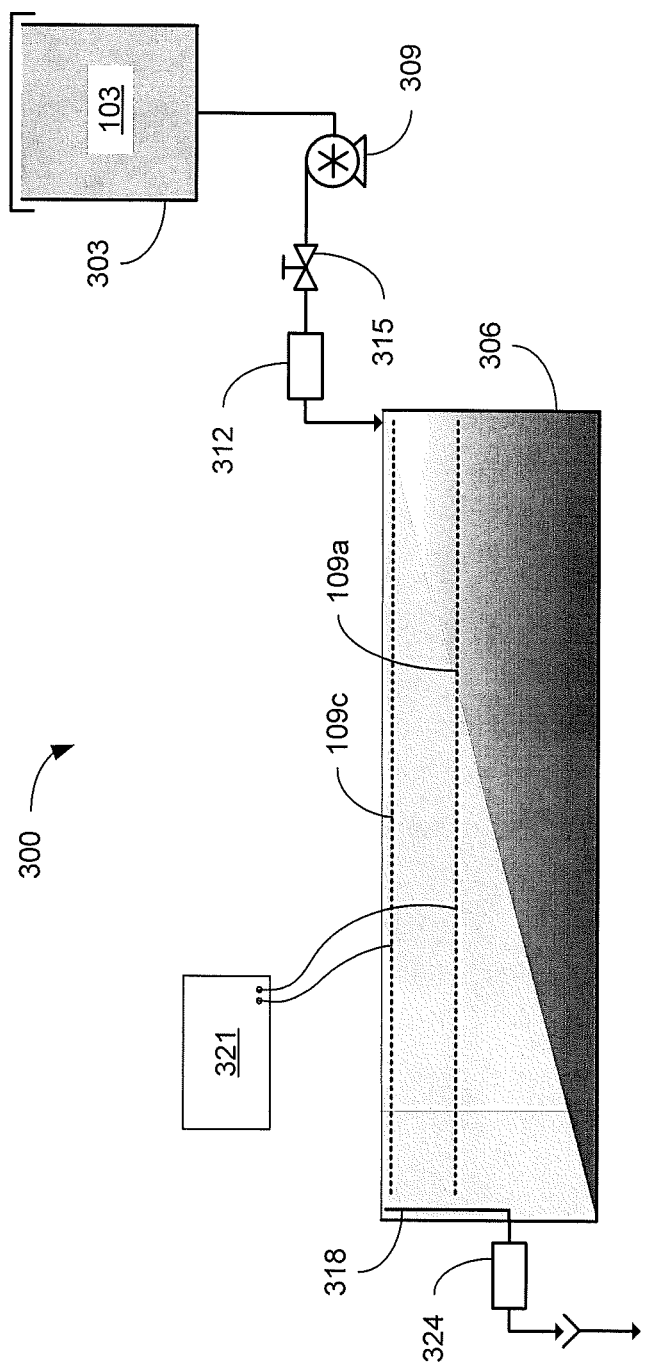
FIG. 3 is a graphical representation of an example of an electrokinetic dewatering (EKD) system in accordance with various embodiments of the present disclosure.

Referring to FIG. 3, shown is a graphical representation of an example of an electrokinetic dewatering (EKD) system 300. The EKD system 300 includes a supply tank 303 (or other reservoir) holding a dilute feed suspension 103, which may be stirred to maintain the solids in solution. The solids content of the dilute feed suspension 103 may be, e.g., in the range of about 3-10 wt %. The dilute feed suspension 103 is delivered from the supply tank 303 to a first end of a separation chamber 306 by a pump 309. In the example of FIG. 3, a flow measurement device 312 is included to provide an indication of the influent flow rate being supplied. A metering valve 315 may be used to control the flow of the dilute feed suspension 103 being supplied to the separation chamber 306. In other implementations, the speed of the pump 309 may be controlled (e.g., by a variable speed drive) to control the suspension flow. The pump 309 and/or the metering valve 312 may be automatically controlled based upon indications from the flow measurement device 315.

In the separation chamber 306, an anode 109a is positioned below a cathode 109c. For instance, the distance between the anode 109a and cathode 109c may be in the range of about 5 cm to about 10 cm, however the distance between the anode 109a and cathode 109c may varied outside of this range. In the example of FIG. 3, the anode 109a and cathode 109c extend from the first end of the separation chamber 306, where the dilute feed suspension 103 is delivered, to a second end of the separation chamber 306, where an overflow 318 is positioned. With the electrodes 109 energized, the electrokinetic action causes the solids to consolidate at the bottom of the separation chamber 306. As the dilute feed suspension 103 flows from the first end to the second end of the separation chamber 306, supernatant water is separated from the solids. The separated supernatant water may then be removed from the separation chamber 306 by the overflow 318. A turbidity measurement device 324 may be included to measure the turbidity of the removed water.

The anode 109a and cathode 109c receive DC power from a power supply 321 such as, e.g., a potentiostat. The cathode 109c may be positioned below and adjacent to the surface of the liquid (or dilute feed suspension) within the separation chamber 306, which is maintained by the position of the overflow 318 within the separation chamber 306. The anode 109a may be closely spaced below the cathode 109c to reduce the voltage levels applied between the electrodes 109 by the power supply 321. The electrodes 109 may be metallic grids such as, e.g., dimensionally stable mesh electrodes made of titanium with an iridium oxide coating or other material suitable for the environment of the EKD system 300.

Figure 4A:
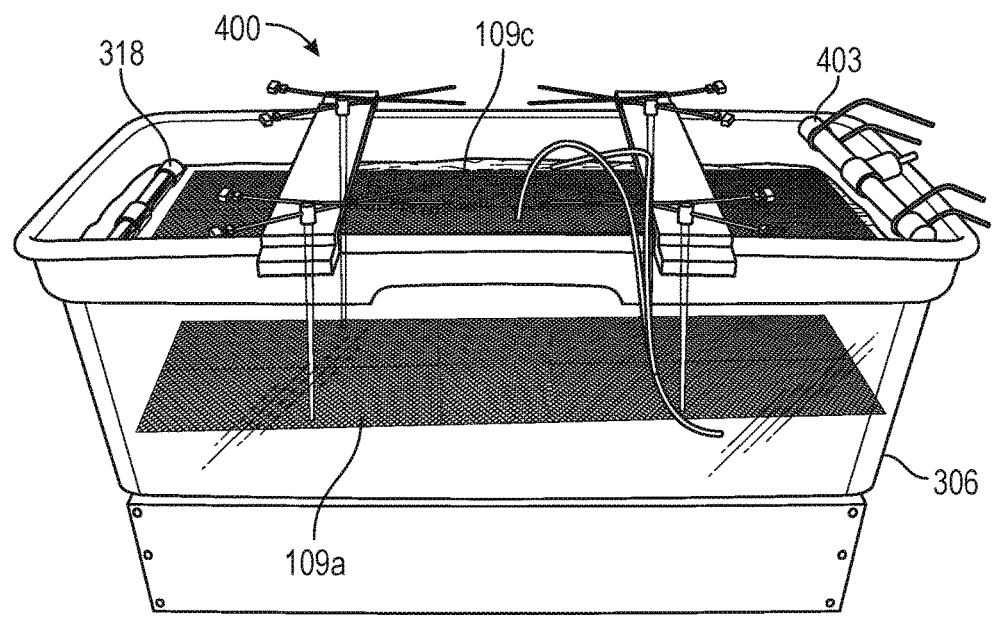
FIGS. 4A-4B are pictures illustrating an example of an EKD system of FIG. 3 in accordance with various embodiments of the present disclosure.
Figure 4B:
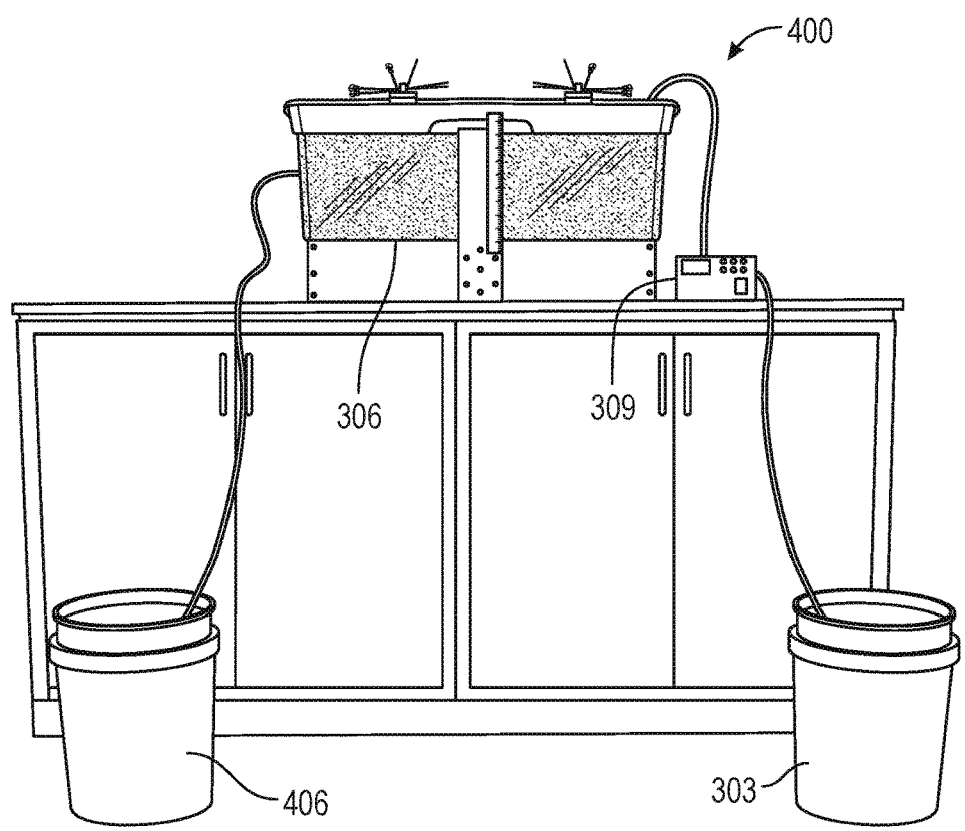

FIG. 4A is a picture illustrating an example of a portion of an EKD system 400 implemented with an inlet nozzle 403 for distributing a dilute phosphatic clay suspension 103 across the first end of a separation chamber 306 and an overflow 318 to remove effluent at the second end of the separation chamber 306, with a cathode 109c positioned between the two ends. An anode 109a is positioned below the cathode 109c. FIG. 4B shows an example of the EKD system 400 using the setup of FIG. 4A. The dilute phosphatic clay suspension 103 was supplied on the first side of the separation chamber 306 by a pump 309 (e.g., a metering pump) from a supply tank 303. The supernatant water collected by the overflow 318 was directed to a second reservoir 406.

Figure 5A:
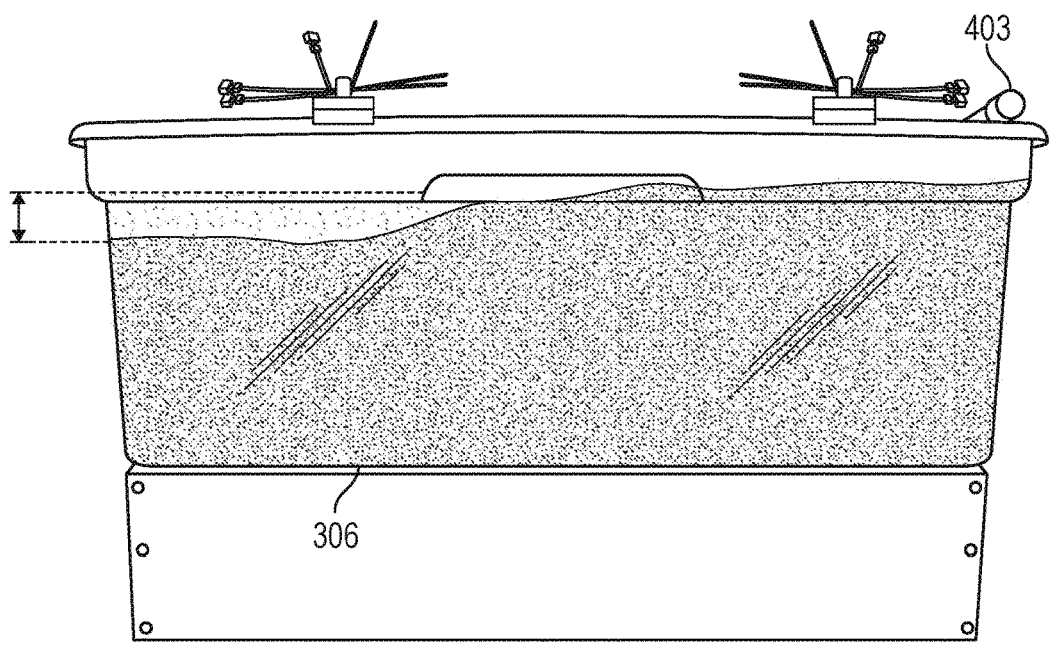
FIGS. 5A-5B and 6A-6B are pictures illustrating experimental results using the EKD system of FIGS. 4A-4B in accordance with various embodiments of the present disclosure.
Figure 5B:
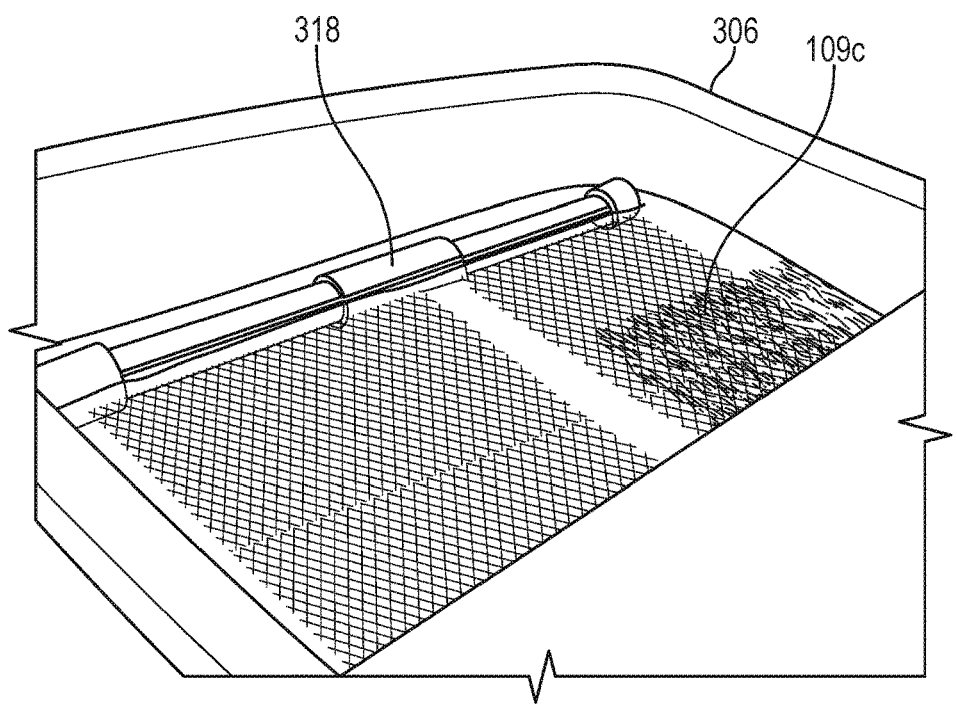

Various experiments were conducted to prove the concept using the EKD system 400 of FIGS. 4A and 4B. In one experiment, a flow rate of 20 ml/min was continuously supplied from the supply tank 303 while maintaining an electric field of 1 V/cm across the electrodes 109. Referring to FIGS. 5A and 5B, shown are side and top views of the separation chamber 306 after about 32 hours of operation of the EKD system 400 at an influent flow rate of 20 ml/min and an electric field of 1 V/cm. As can be seen in the side view of FIG. 5A, the solids begin settling on the first side of the separation chamber 306 allowing a layer of clear water approximately ⅙ of the height of the separation chamber 306 to form in the second side of the separation chamber 306 next to the overflow 318. FIG. 5B shows that the solids have settled below the cathode 109c with clear water over the cathode 109c. When tested under the same conditions, except without a voltage applied to the electrodes 109, no separation of the supernatant water from the solids was observed.

Figure 6A:
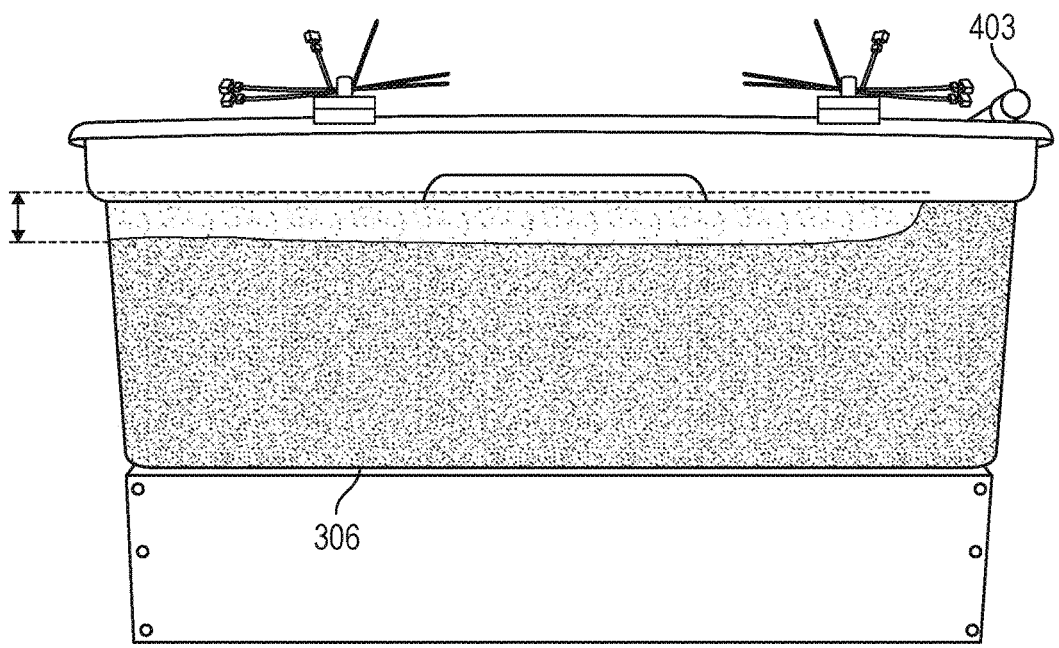
Figure 6B:
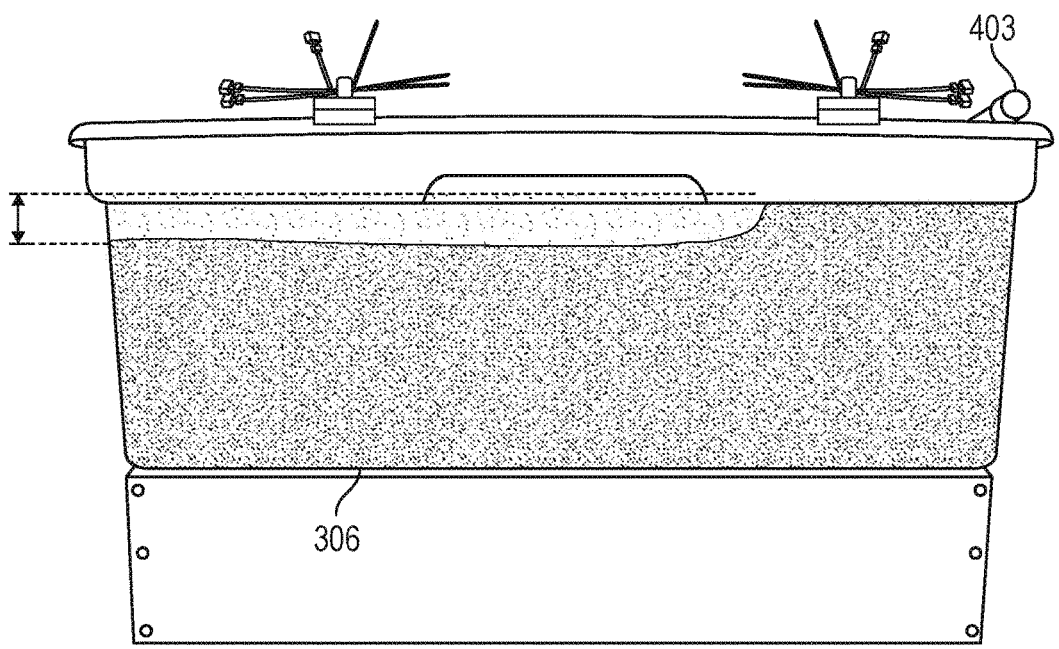

In another experiment, a flow rate of 20 ml/min was continuously supplied from the supply tank 303 while maintaining an electric field of 2 V/cm across the electrodes 109. FIG. 6A illustrates the effect of a higher electric field level after 6 hours of operation. As can be seen in FIG. 6A, operation at the higher electric field produces results that are similar to FIG. 5A in a shorter period of time. FIG. 6B shows the results of an experiment at an influent flow rate of 40 ml/min and an electric field of 3 V/cm. After 4 hours of operation, similar separation of the supernatant water from the solids was observed.

Figure 7:
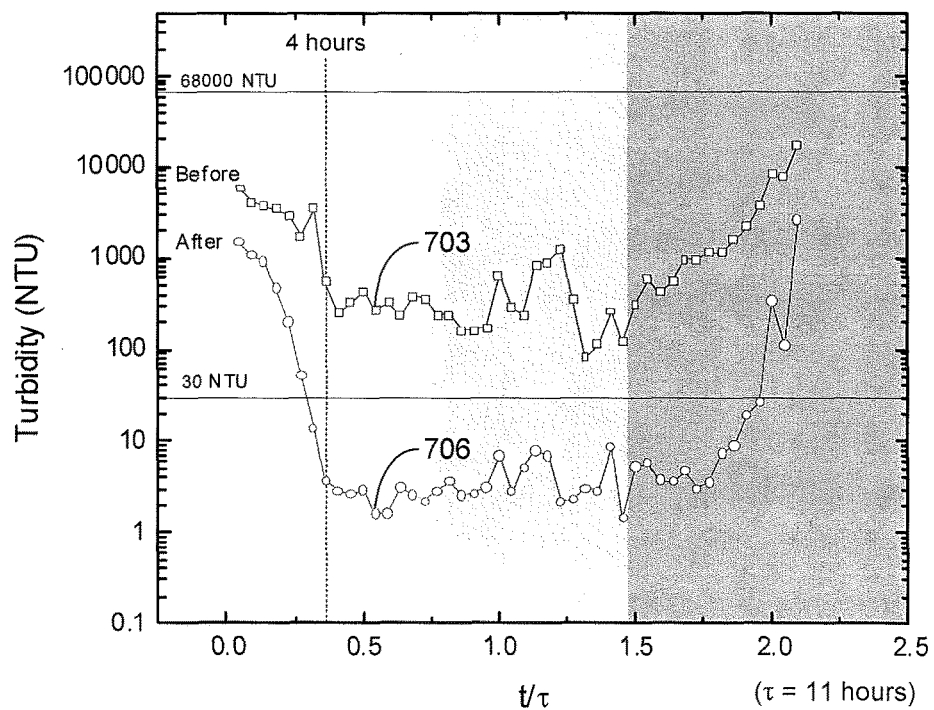
FIG. 7 is a plot of turbidity measurements of various effluent supernatant water samples obtained using the EKD system of FIGS. 4A-4B in accordance with various embodiments of the present disclosure.

Turbidity measurements were conducted on the effluent supernatant water obtained via the overflow 318 of the EKD system 400. Referring to FIG. 7, shown is an example of the turbidity measurements obtained using a HACH 2100Q Portable Turbidimeter for of various effluent supernatant water samples an experiment with an electric field of 3 V/cm and an influent flow rate of 40 ml/min. Effluent samples of supernatant water were collected every 30 minutes during the operation. The supernatant turbidity, measured immediately after the sample was collected, is plotted as curve 703 in FIG. 7 in nephelometric turbidity units (NTU). The turbidity of the initial sample was 68,000 NTU. The turbidity decreased sharply at the beginning of experiment, and reached a steady state condition after about 4 hours. The turbidity remained relatively stable at the low level until the accumulation of solids exceeded the capacity of the separation chamber 306, causing an increase in the effluent turbidity. The effluent sample was allowed to settle in the sample cell for 24 hours after sampling. After settling, the supernatant turbidity of the effluent samples dropped dramatically as indicated by curve 706. During the pseudo-steady-state operation (after about 4 hours), supernatant turbidity was lower than 30 NTU, which satisfies the requirement for process water.

Figure 8A:
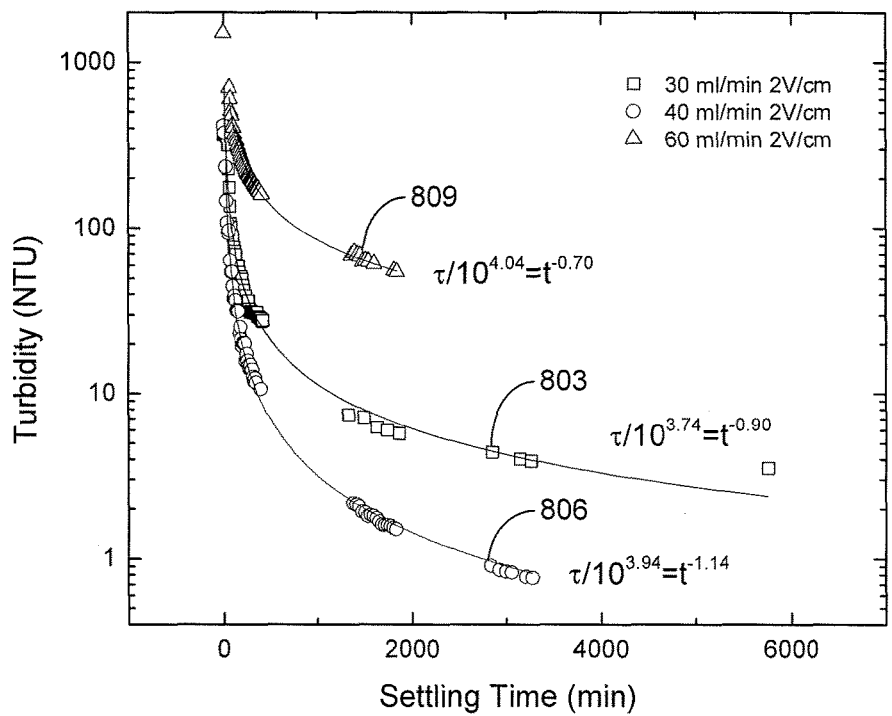
FIGS. 8A, 8B, and 8C are plots of turbidity measurements during free settling of various effluent supernatant water samples obtained using the EKD system of FIGS. 4A-4B in accordance with various embodiments of the present disclosure.
Figure 8B:
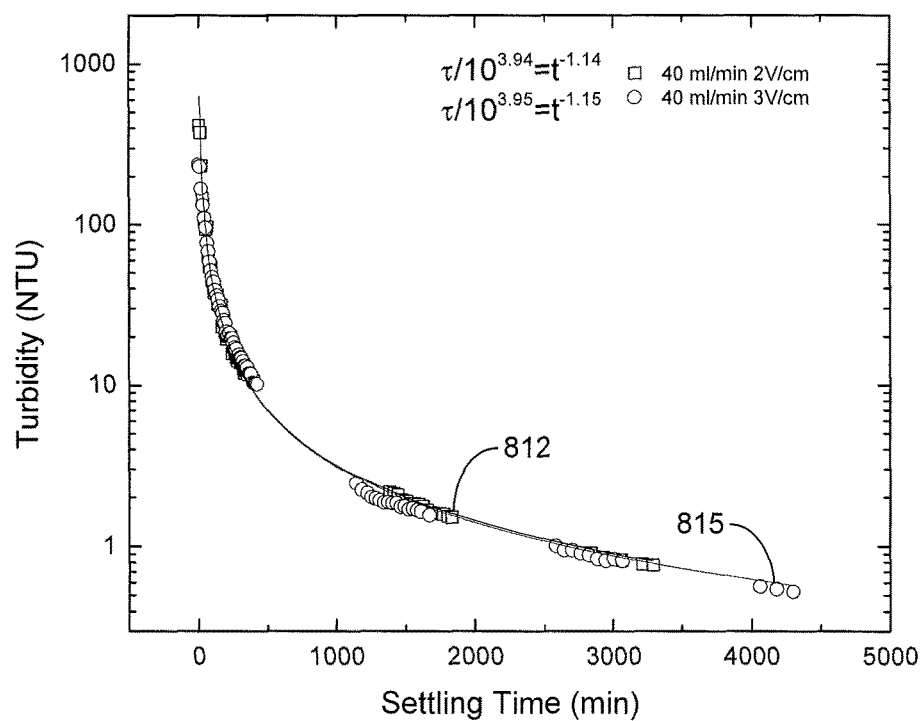
Figure 8C:
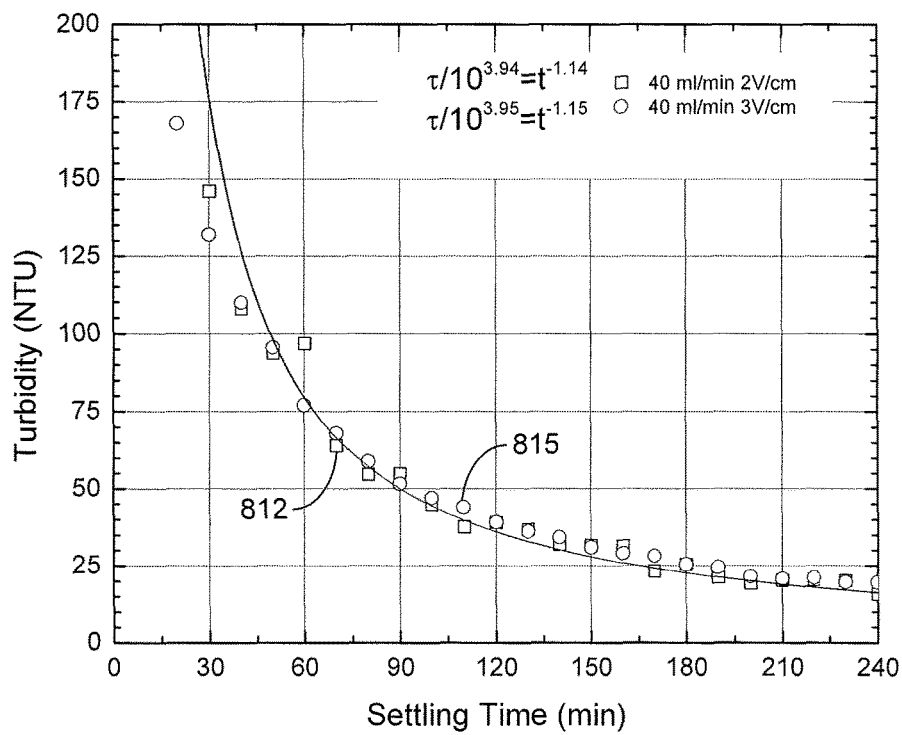

The settling process over a long-term period (2,000 to 6,000 minutes) is illustrated in FIG. 8A for samples that were taken during the pseudo-steady-state part of the experiment. The results indicate that the supernatant turbidity dropped quickly in the first 24 hours to a value less than 10 NTU for experiments conducted at influent flow rates of 30 ml/min (curve 803) and 40 ml/min (curve 806) and applied electric fields of 2 V/cm. Such low values for turbidity were not observed at the higher 60 ml/min flow rate (curve 809). As shown in FIGS. 8B and 8C, similar short-time settling behavior was seen for an influent flow rate of 40 ml/min and applied electric fields of 2 V/cm (curve 812) and 3 V/cm (curve 815). For these conditions, a turbidity of about 50 NTU could be achieved in about 90 minutes of free settling and about 30 NTU in about 140 minutes.

Figure 9:
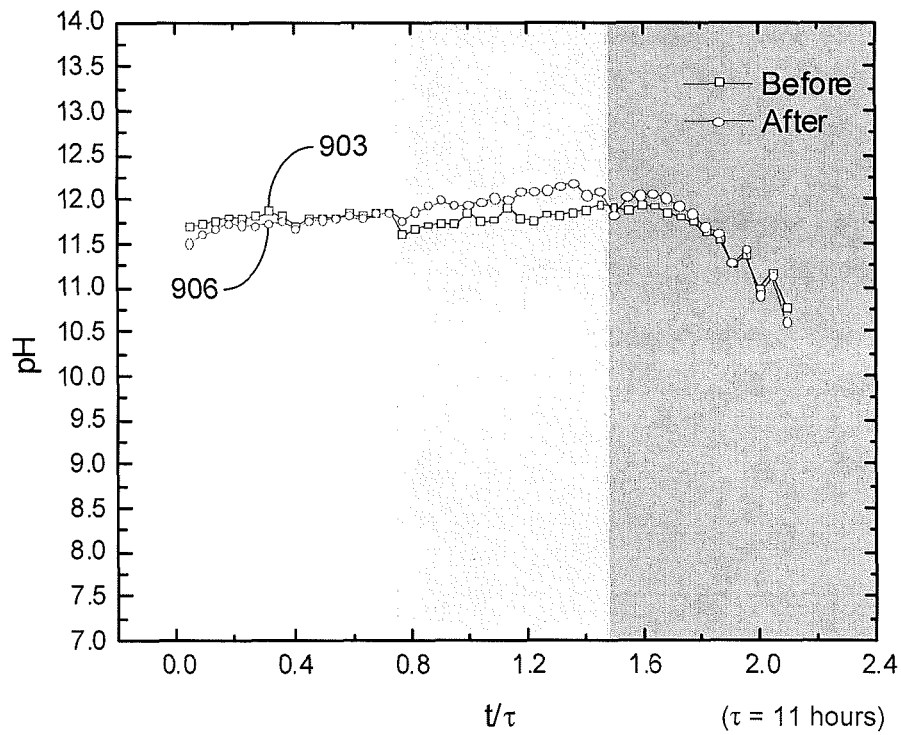
FIG. 9 is a plot of pH measurements of the effluent supernatant water samples of FIG. 7 in accordance with various embodiments of the present disclosure.

The pH of the supernatant water was measured and plotted in a similar manner. The pH of the phosphatic clay suspension 103 entering the separation chamber 306 was equal to 7. As shown in FIG. 9, the pH of the supernatant samples increased rapidly to about 11.7 and remained stable around this value until the accumulation of solids exceeded the capacity of the separation chamber 306. There was no significant change of pH before (curve 903) and after (curve 906) the free settling of supernatant samples. The alkalinity of the supernatant water is a result of the electrochemical reaction at the cathode 109$c$ that dissociates the water to create hydrogen gas ($H_2$) and hydroxide ions ($OH^-$). Experiments were also performed to determine the effect of pH on the sedimentation at different pH values. Sedimentation of two samples with pH values of 7.1 and 11.7 were observed over 10 days. The results indicate that the alkaline character of the supernatant water does not account for the improved the dewatering process. Thus, the small value of supernatant turbidity after settling can be attributed to the electrokinetic dewatering (EKD) process.

Figure 10:
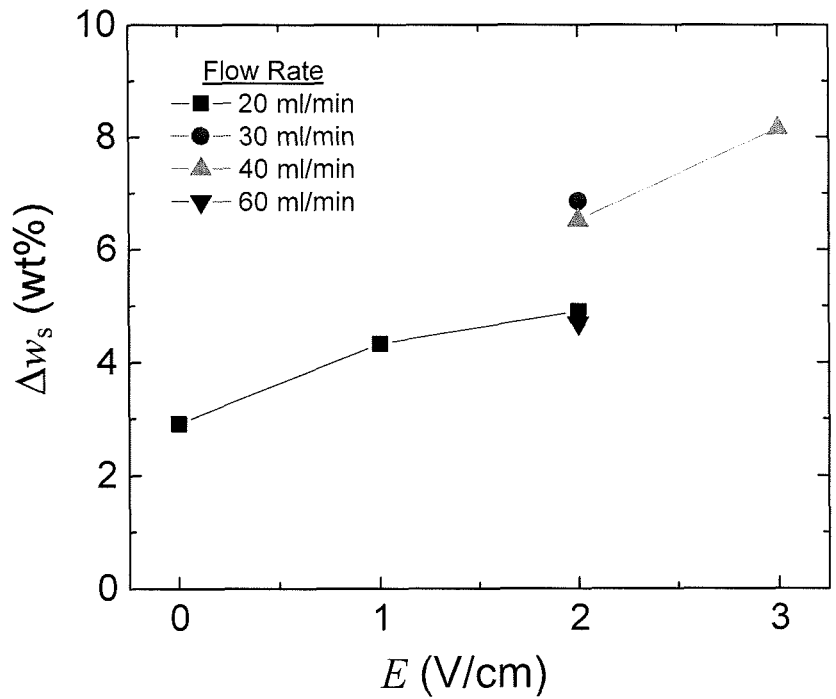
FIG. 10 is a plot of change in solids content ($\Delta w_s$) with respect to applied electric field (E) at various flow rates using the EKD system of FIGS. 4A-4B in accordance with various embodiments of the present disclosure.

The solids content of the residual clay samples removed from the separation chamber 306 after dewatering was also measured before and after every experiment. The change in solids content ($\Delta w_s$), presented in FIG. 10, shows that the increase in solids content is strongly dependent on the applied electric field (E), which is in agreement with EQN. 1. At an energy cost of $0.10/kW-hr, the EKD system 400 of FIGS. 4A and 4B operates at an energy cost of about $3/1,000 kg of clean water produced.

A semi-continuous process such as that demonstrated by the EKD system 400 of FIGS. 4A and 4B includes continuous flow of the dilute feed suspension 103 through the separation chamber 306 until the accumulation of solids reach or exceed the capacity of the separation chamber 306, at which time the flow of the dilute feed suspension 103 is suspended while the consolidated solids are removed from the separation chamber 306. A continuous process allows for removal of the accumulated solids from the separation chamber 306 without interrupting the flow of the dilute feed suspension 103. A removal mechanism located in the bottom of the separation chamber 306 may be used to extract the solids have settled in the separation chamber 306.

Figure 11:
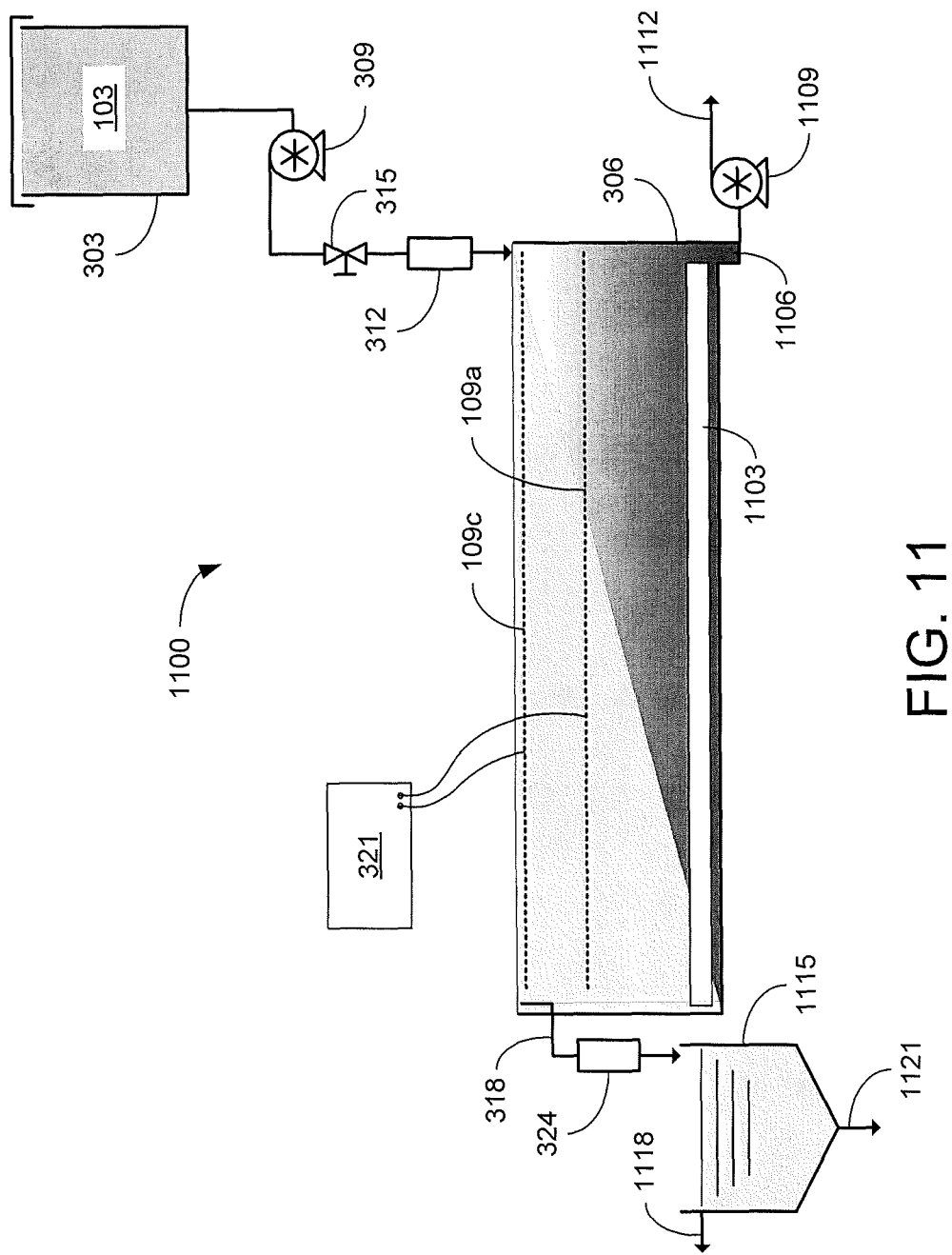
FIGS. 11 and 12 are graphical representations of examples of other EKD systems in accordance with various embodiments of the present disclosure.

Referring to FIG. 11, shown is a graphical representation of an example of a continuous electrokinetic dewatering (EKD) system 1100. As in the EKD system of FIG. 3, the dilute feed suspension 103 is delivered from the supply tank 303 to a first end of a separation chamber 306. A continuous influent flow rate may be provided by pump 309. With the electrodes 109 energized by the power supply 321, supernatant water is separated from the solids as the dilute feed suspension 103 flows from the first end to the second end of the separation chamber 306. The separated supernatant water may then be removed from the separation chamber 306 by the overflow 318 and the solids consolidate at the bottom of the separation chamber 306. A removal mechanism 1103 moves the solids toward a sump 1106 in the bottom of the separation chamber 306 where a slurry pump 1109 extracts the accumulated solids in a solids-rich stream or slurry 1112 for further processing. The removal mechanism 1103 may be, e.g., a rotating or linear scraper that pushes the bottom of the accumulated solids towards the sump 1106. The separated supernatant water may be removed from the separation chamber 306 by the overflow 318 and sent to a clarifier 1115. The supernatant water may be allowed to settle in the clarifier 1115 to further reduce the turbidity of the process water effluent 1118. It is desirable for the product water 1118 to have a turbidity lower than 30 NTU, which would be appropriate for recycling back to the beneficiation plant. As the solids settle to the bottom of the clarifier 1115, they may be discharged as a solids-rich effluent 1121 for further processing.

Figure 12:
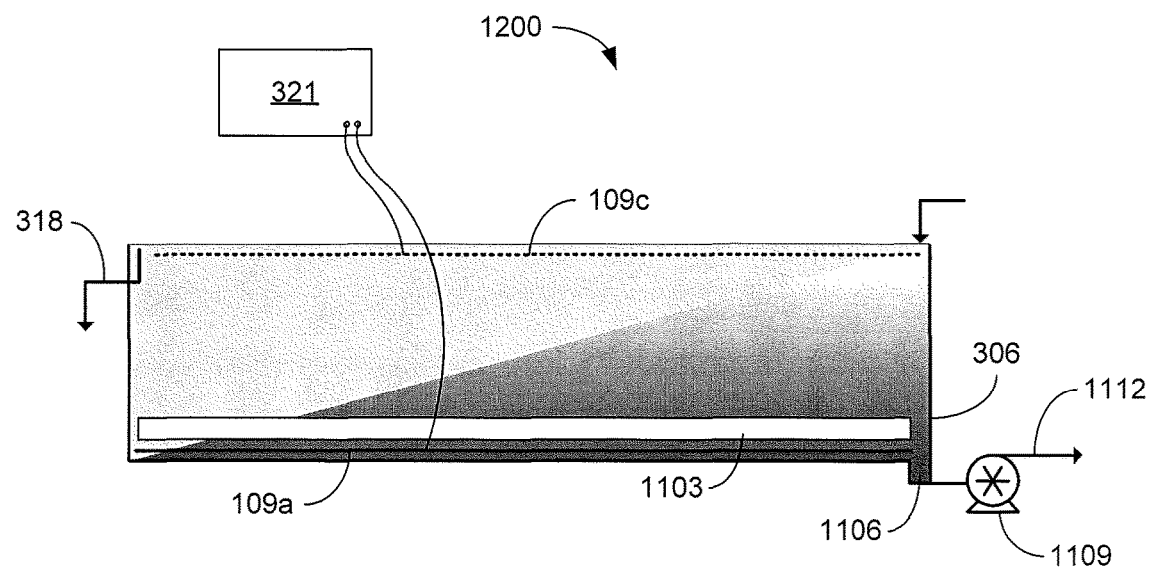
Figure 13:
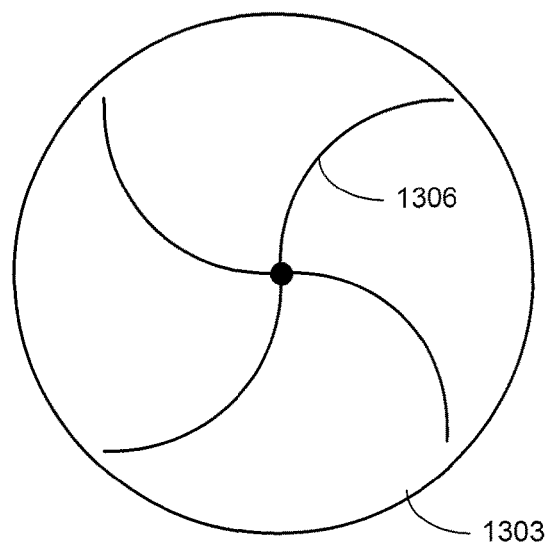
FIG. 13 is a graphical representation of an example of a removal mechanism of the EKD systems of FIGS. 11 and 12 in accordance with various embodiments of the present disclosure.

Referring now to FIG. 12, shown is a graphical representation of another example of a portion of a continuous EKD system 1200. In the example of FIG. 12, the anode is located below the removal mechanism 1103. As the dilute feed suspension 103 flows from the first end to the second end of the separation chamber 306, the solids consolidate at the anode 109$a$ located at the bottom of the separation chamber 306. The removal mechanism 1103 moves the solids toward a sump 1106 in the bottom of the separation chamber 306 where a slurry pump 1109 extracts the accumulated solids in a solids-rich stream or slurry 1112 for further processing. The removal mechanism 1103 may be a rotating scraper 1303 as illustrated in the top view of FIG. 13. As the scraper 1303 rotates, arms 1306 push the accumulated solids towards the sump 1106. The scraper material should be resistant to wear, structurally rigid, nonconductive, and compatible with the acidic environment of the separation chamber 306. In other implementations, the removal mechanism 1103 may be a linear scraper such as, e.g., a conveyor belt with ribs that moves the accumulated solids towards the sump 1106.

The anode 109$a$ should also accommodate the removal of solids. For example, a smooth sheet may be used as the anode 109$a$ to facilitate removal of the accumulated solids. The anode 109$a$ should also be constructed of a corrosion-resistant electro-catalytic material. For example, an iridium-oxide-coated titanium dimensionally stable electrode may be used. The cathode 109$c$ may be made of a less expensive material, but the electro-catalytic nature of the iridium-oxide-coated titanium dimensionally stable electrode makes it appealing. The body of the separation chamber 306 and the internal components of the pumps 309 and 1109 may also be constructed of a nonconductive material to avoid unintentional ground loops.

Figure 14:
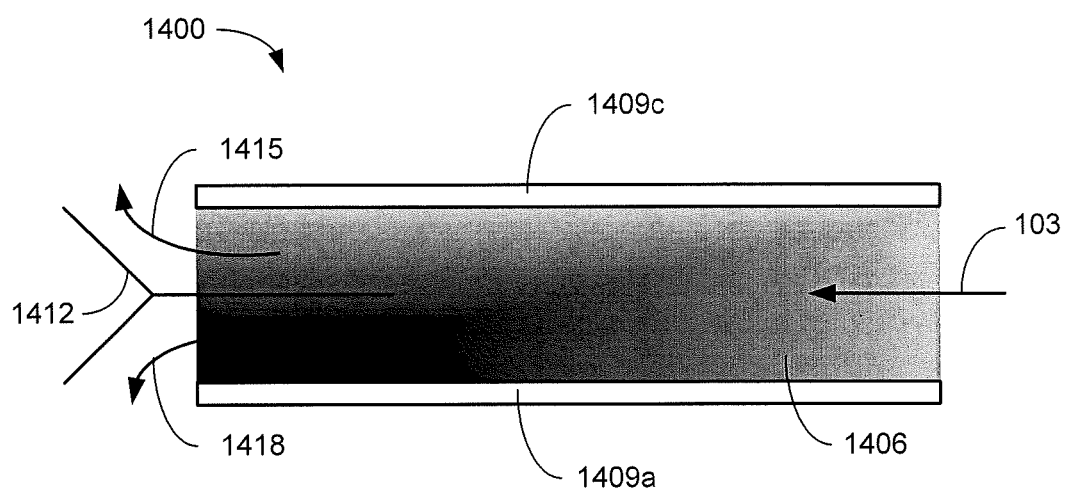
FIG. 14 is a graphical representation of an example of another EKD system in accordance with various embodiments of the present disclosure.

Referring next to FIG. 14, shown is a graphical representation of an example of a continuous EKD system 1400. FIG. 14 may be a top view of a dilute feed suspension 103 such as, e.g., phosphatic clay suspension is supplied at an inlet of a separation chamber 1406 including an anode 1409$a$ and a cathode 1409$c$ on opposite sides of the separation chamber 1406. The electrodes 1409 are energized to establish an electric field across the separation chamber 1406. As the dilute feed suspension 103 passes through the separation chamber 1406, solids in the dilute feed suspension 103 are drawn by the applied electric field toward the anode 1409a thereby separating the solids from the supernatant water. The length of the separation chamber 1406 may be extended to allow for additional separation of the solids. When the flow through the separation chamber 1406 reaches the outlet, a diverter 1412 directs the supernatant water 1415 along one processing path while directing the solids enriched suspension (or slurry) 1418 along another path. In another implementation, FIG. 14 may be a side view of the continuous EKD system 1400. In this way, gravity may act in the direction of the electric field to aid in the separation of the solids from the supernatant water 1415. While the diverter 1412 is depicted as being positioned in the center of the separation chamber 1406, in other implementations the diverter 1412 may be offset toward the cathode 1409c to reduce the amount of solids that are diverted with the supernatant water 1415.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A system for electrokinetic dewatering, comprising:
a separation chamber including:
a first side and a second side,
a first end and a second end extending across the separation chamber between the first side and the second side;
a bottom extending between the first side, the second side, the first end and the second end, and
an anode and a cathode each having a length extending between the first end and the second end of the separation chamber, and a width extending between the first side and the second side of the separation chamber, the cathode positioned below and adjacent to a surface of a feed suspension in the separation chamber, the cathode substantially parallel to the surface of the feed suspension in the separation chamber, and the anode positioned below the cathode;

an inlet at the first end of the separation chamber, the inlet configured to supply the feed suspension comprising solids suspended in water over a first end of the cathode at the first end of the separation chamber, wherein the inlet comprises an inlet nozzle configured to distribute the feed suspension across the width of the cathode at the first end of the separation chamber, the cathode comprising openings configured to allow the feed suspension distributed across the first end of the cathode to pass through the cathode and the solids in the feed suspension to settle in the separation chamber;

a power supply configured to energize the anode and the cathode to establish an electric field between the anode and the cathode to consolidate the solids away from the cathode; and an outlet at the second end of the separation chamber, the outlet configured to remove supernatant water from the separation chamber adjacent to a second end of the cathode, the outlet comprising an overflow extending across the width of the cathode at the second end of the separation chamber, where the overflow has a horizontal opening positioned to separate and remove supernatant water over the cathode without removing fluids from the feed suspension below the cathode and consolidated solids below the cathode.

2. The system of claim 1, further comprising a second outlet at the first end of the separation chamber, the second outlet configured to remove the consolidated solids from the separation chamber.

3. The system of claim 2, further comprising a removal mechanism inside the separation chamber, wherein the removal mechanism comprises arms or ribs that move the consolidated solids toward the second outlet at the first end of the separation chamber, wherein the second outlet is below the inlet.

4. The system of claim 3, wherein the removal mechanism is a rotating scraper located adjacent to and substantially parallel with the bottom of the separation chamber, where the rotating scraper comprises a plurality of arms extending radially outward from a center point about which the rotating scraper rotates and pushes the consolidated solids to the second outlet, wherein the second outlet is in the bottom of the separation chamber.

5. The system of claim 1, further comprising:
a pump that supplies the feed suspension to the inlet; and
a supply tank that supplies the feed suspension to the pump, the supply tank configured to stir the feed suspension thereby maintaining the solids in the supply tank in solution.

6. The system of claim 1, wherein the feed suspension is supplied to the inlet at a constant flow rate and distributed, through an opening extending along a length of the inlet nozzle, across the width of the cathode at the first end of the separation chamber.

7. The system of claim 1, wherein the cathode comprises a dimensionally stable mesh electrode.

8. The system of claim 1, wherein the anode is positioned below and substantially parallel to the cathode.

9. The system of claim 8, wherein the anode comprises a dimensionally stable mesh electrode.

10. The system of claim 8, wherein the anode comprises a plate electrode.

11. The system of claim 1, wherein the outlet comprises a diverter configured to direct the supernatant water adjacent to the cathode from the separation chamber.

12. The system of claim 1, wherein the inlet is configured to distribute the feed suspension with a solids content of up to about 10 wt %.

13. The system of claim 1, wherein the inlet is located at a top of the first end of the separation chamber, the inlet extending between the first and second sides of the separation chamber, and the feed suspension is distributed across the width of the first end of the cathode through an opening extending along a length of the inlet nozzle.

14. The system of claim 2, wherein the second outlet comprises a sump at the first end of the separation chamber, the sump coupled to a pump.

15. The system of claim 3, wherein the anode comprises a dimensionally stable mesh electrode positioned between the cathode and the removal mechanism allowing the solids to consolidate toward the bottom of the separation chamber when the anode and cathodes are energized.

16. The system of claim 15, wherein a distance between the anode and the cathode is in a range from about 5 cm to about 10 cm.

17. A system for electrokinetic dewatering, comprising:
a separation chamber including an anode and a cathode each extending between a first end of the separation chamber and a second end of the separation chamber;
an inlet at the first end of the separation chamber, the inlet configured to supply a feed suspension comprising solids suspended in water to the separation chamber;
a power supply configured to energize the anode and the cathode to establish an electric field between the anode and the cathode to consolidate the solids away from the cathode; and
an outlet at the second end of the separation chamber, the outlet configured to remove supernatant water adjacent to the cathode from the separation chamber, wherein the outlet comprises a diverter configured to direct the supernatant water adjacent to the cathode from the separation chamber and the diverter defines a second outlet configured to direct the consolidated solids from the separation chamber.

18. The system of claim 17, wherein the cathode defines a top of the separation chamber, the anode defines a bottom of the separation chamber, and where the anode is substantially parallel to the cathode.

* * * * *